July 17, 1962     J. A. BERNARD     3,044,594
REFRIGERATING APPARATUS
Filed Nov. 5, 1958     2 Sheets-Sheet 1
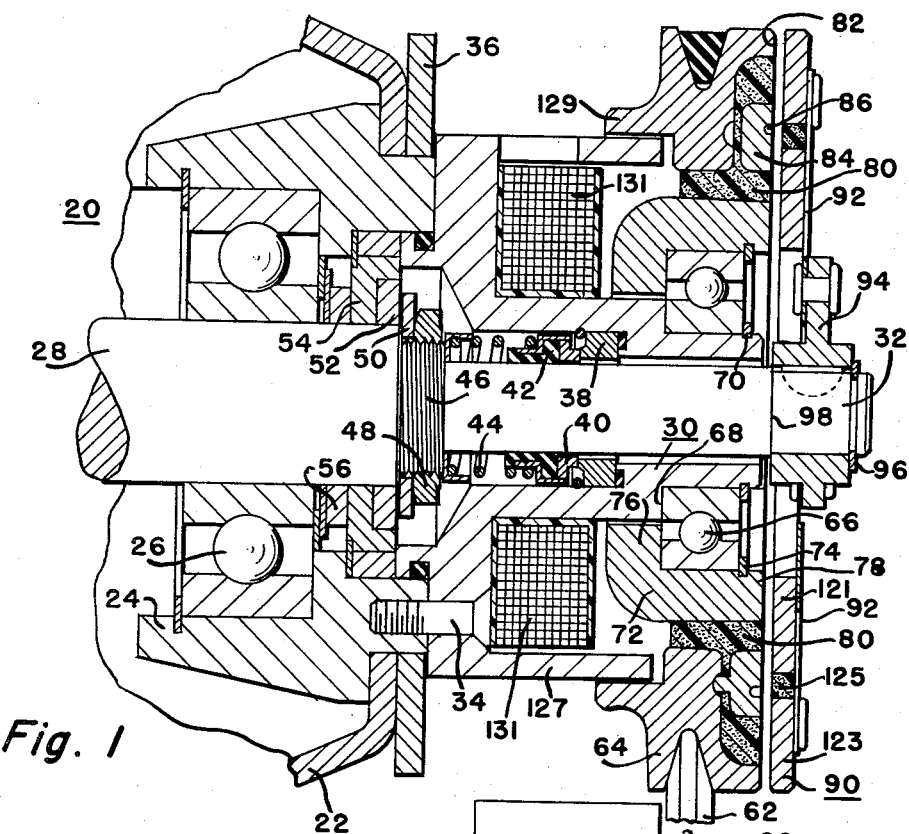
INVENTOR.
James A. Bernard
BY Edwin S. Dybing
His Attorney

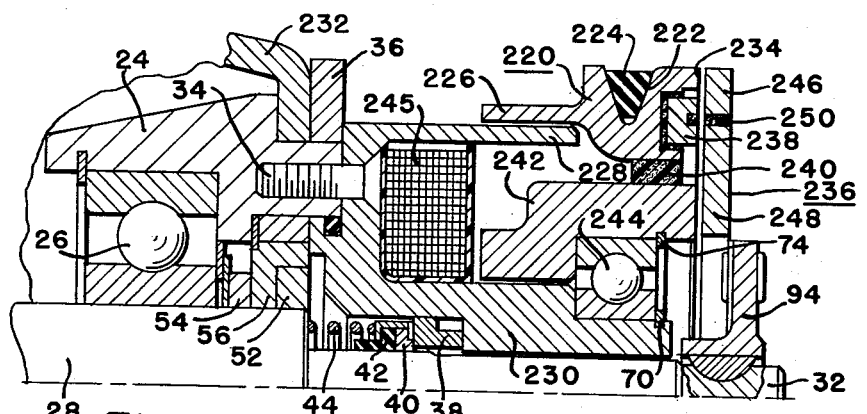
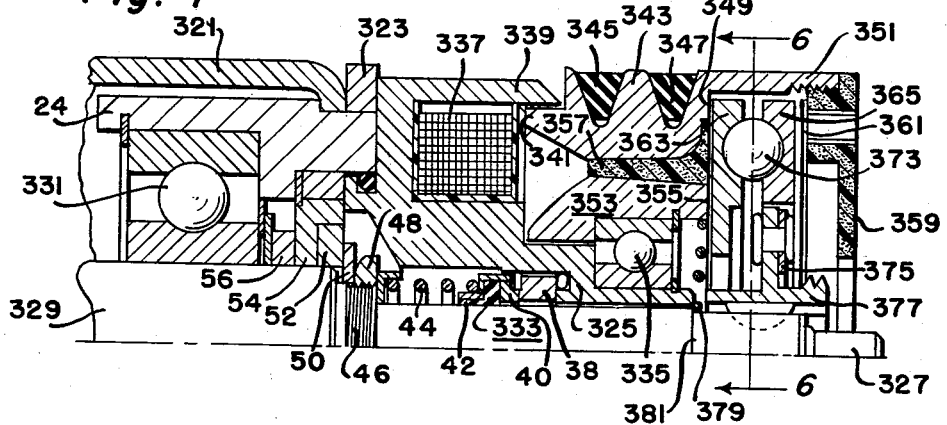
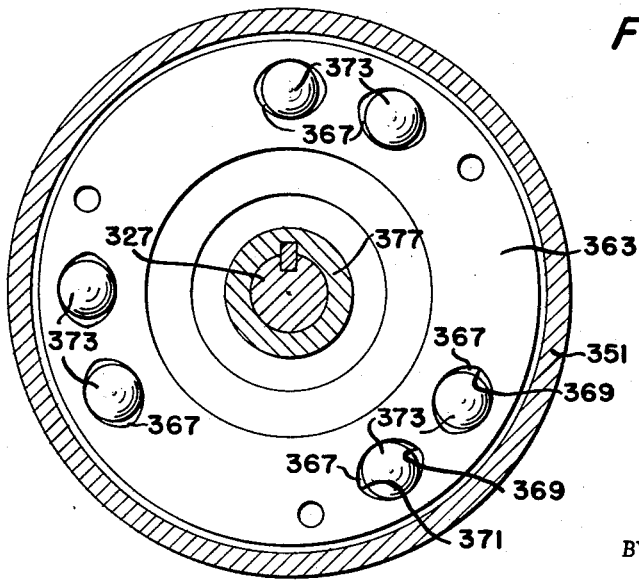
INVENTOR.
James A. Bernard
BY Edwin S. Dybvig
His Attorney

United States Patent Office 3,044,594
Patented July 17, 1962

3,044,594
REFRIGERATING APPARATUS
James A. Bernard, Dayton, Ohio, assignor to General Motors Corporation, Detroit, Mich., a corporation of Delaware
Filed Nov. 5, 1958, Ser. No. 772,122
7 Claims. (Cl. 192—84)

This invention is related in a general way to refrigerating apparatus but more particularly to electromagnetic clutch drives such as may be used in a variety of driving applications, especially for the driving of automobile compressors for air conditioning systems.

In automotive air conditioning refrigerating systems it has been found most economical to drive the refrigerant compressor through pulleys and belts from the engine which drives the car. Obviously, the engine must operate primarily at such times and at such speeds according to the desired operation of the car and the shifting of the transmission. Consequently, serious problems are encountered in the control of automobile air conditioning refrigeration systems.

It is desirable that the compressor be disconnected from the engine to relieve the engine from this load and to avoid useless operation of the compressor whenever refrigeration is not required. In the past, it has been found that clutches between the engine and the compressor could not withstand repeated clutching and declutching to cycle the compressor in accordance with temperature or refrigerating requirements so that it was necessary to provide a by-pass circuit in which a by-pass valve was cycled to regulate the amount of refrigeration applied to the air for the purpose of regulating the temperature within the car. The clutch then was operated only to manually start and stop refrigeration. Even with this limited duty, frequent difficulties were encountered in that pulley ball bearing failures occurred while the clutch was engaged during operation of the compressor. At this time there was no relative rotation between the pulley and the shaft and, therefore, no relative rotation of the races and balls of the pulley bearing. During such periods vibration caused the balls to fret the races of the ball bearing causing failures thereof.

It is an object of this invention to provide a clutch arrangement in which there always will be relative rotation of the bearing parts and in which stresses on the shaft and shaft bearings are minimized.

It is another object of this invention to provide a clutch arrangement capable of repeated clutching and declutching without failure, as required by a temperature control responsive to the air in the car.

It is another object of this invention to provide a simple, relatively inexpensive, compact electromagnetic clutch arrangement in which a small electric current will control great clutching power.

These and other objects are attained in the forms shown in the drawings in which the housing of the compressor or other device to be driven is provided with a tubular extension supporting the ball bearing for the pulley. The driven shaft extends from within the housing out through the tubular extension and is connected by three leaf-springs to an axially movable armature disc of magnetic material. The electromagnet coil is mounted upon the tubular extension. The tubular extension has a flange extending adjacent to a rim portion of magnetic material of the pulley so as to provide an efficient bridge for the magnetic flux. The pulley includes an inner section of magnetic material mounted on the outer race of the ball bearing extending into close relationship with the tubular extension so as to form an efficient magnetic bridge therewith. This inner section of magnetic material extends toward the magnetic clutch disc to form an annular magnetic pole face adjacent the disc. The pulley has a flange portion, also extending, to form an annular pole face adjacent the armature disc. The pulley includes a portion of non-magnetic material between its rim and the magnetic section which preferably is of an adhesive long wearing heat resisting brake lining material such as an epoxy resin, containing asbestos fibers.

If desired, the brake lining material may also surround an annular inter-pole of magnetic material having its face aligned with the annular pole faces of the inner magnetic section and the pulley rim. The armature disc then preferably has two separate annular pole faces, one of which spans the annular pole face of the magnetic section and the adjacent portion of the annular inter-pole while the outer portion spans the outer portion of the annular inter-pole and the annular pole upon the pulley rim. An annular portion of brake lining material bonds the two annular pole face portions of the armature disc together.

Further objects and advantages of the present invention will be apparent from the following description, reference being had to the accompanying drawings wherein a preferred embodiment of the present invention is clearly shown.

In the drawings:

FIGURE 1 is a vertical sectional view, partly diagrammatic, illustrating a clutch drive embodying one form of my invention;

FIGURE 2 is an end view, on a reduced scale, of the clutch drive shown in FIGURE 1;

FIGURE 3 is a fragmentary vertical section of a portion of a modified clutch drive similar in principle to that shown in FIGURE 1 but omitting the inter-pole;

FIGURE 4 is a fragmentary vertical section of another form of clutch drive showing a slightly different inter-pole arrangement;

FIGURE 5 is a fragmentary vertical sectional view of another modified form of clutch drive in which the electromagnetic clutch is used to trigger a set of spreader reaction clutch discs; and FIGURE 6 in a transverse vertical sectional view taken substantially along the lines 6—6 of FIGURE 5.

Referring now to the drawings and more particularly to FIG. 1, there is shown a device to be driven, such as a refrigerant compressor 20, provided with a housing 22 containing an annular support 24 for supporting the outer race of the inner ball bearing 26. The inner race of the ball bearing 26 supports the drive shaft 28 of the compressor or other device to be driven.

The housing 22 is provided with a cantilever tubular extension 30 surrounding the extension 32 of the shaft 28. This tubular extension 30 is fastened to the housing 22 by screws 34 or other suitable means which thread into the bearing support 24 and also fasten the mounting bracket 36 to the housing 22. The tubular extension 30 supports a stationary shaft seal ring 38 which is sealed to it and against which rotates a shaft seal ring 40 which is sealed to the shaft extension 32 by the collar 42 of elastomeric material. The collar 42 is held against the ring 40 and the ring 40 is held against the ring 38 by a compression type coil spring 44 extending from the collar 42 to a threaded shoulder 46 provided at the inner end of the shaft extension 32. A nut 48 on the threaded shoulder supports a ring 50 cooperating with the bearing rings 52 and 54 and an annular ring 56 fastened to the bearing support 24 to provide a thrust bearing for the shaft 28.

The compressor 20 or other device to be driven is driven from the engine 58 of an automobile, truck or other vehicle through a pulley 60 and a belt 62 engaging and fitting in the V-groove of the pulley rim 64. According to my invention, to provide an improved magnetic attraction and long life for the clutch, the pulley is made of composite construction and is rotatably mounted upon the cantilever tubular housing extension 30 through the ball bearing 66 having its inner race mounted against the shoulder 68 on the tubular extension 30 and held in place by a snap ring 70 mounted in an annular groove at the outer end of the tubular extension 30. The outer race of the ball bearing 66 is mounted against the shoulder of the annular inner magnetic section 72 of the pulley. This section 72 has an annular groove at its outer end which receives the snap ring 74 holding the outer race of the ball bearing 66 in place against the shoulder, as shown in FIG. 1.

The magnetic section 72 has an inwardly extending flange terminating in an inner annular surface 76 adjacent the larger portion of the shaft extension 30 sufficiently close to provide an efficient bridge for the magnetic flux. The magnetic section 72 also extends axially to provide an inner annular pole face 78. The magnetic section 72 is bonded to the pulley rim by suitable brake lining material 80. This brake lining material is preferably a longlasting heat insulating material forming a strong bond with the magnetic section 72 and the pulley rim 64. Preferably, this brake lining material is a suitable epoxy resin containing asbestos or cotton fibers and has a high coefficient of friction and prevents the flow of magnetic flux between the rim 64 and the magnetic section 72. However, if desired, other long-wearing heat insulating brake lining materials or other similar materials may be used. The pulley rim 64 is provided with an annular axially extending flange which terminates in an annular pole face 82 in alignment with the pole face 78 of the inner magnetic section.

To further improve the magnetic attraction, there is provided between the pole faces 78 and 82 an annular inter-pole ring 84 of some suitable magnetic material as sintered iron or soft steel having little projections thereon keeping it spaced from the pulley rim 64. This inter-pole ring 84 is embedded in the brake lining material 80 which surrounds it on three sides and spaces it from the pulley rim 64 and the magnetic section 72. The inter-pole ring 84 has two pole faces in alignment with the pole faces 78 and 82 which are separated by the annular notch 86. The magnetic section 72, the brake lining material 80, the inter-pole ring 84 and the pulley rim 64 all consititute a part of the composite pulley which is mounted upon the outer race of the ball bearing 66 having its inner race mounted upon the tubular extension 30.

By this arrangement all pull and tension of the belt 62 upon the pulley rim 64 is absorbed by the ball bearing 66 and the tubular extension 30 without imparting any stress or strain to the shaft extension 32, the shaft 28, the thrust bearing 56 and the shaft bearing 26. Furthermore, this overcomes the difficulty with previous clutches in which the ball bearing corresponding to the bearing 66 was mounted directly on the shaft extension 32. In the former arrangemnet, when the clutch was engaged, there would be no relative rotation between the inner and outer races of the ball bearing. Any vibration and strain on the bearing at this time, particularly due to the tension of the belt 62, appeared to cause fretting of the balls and the ball races. The fretting was sufficient to eventually cause failure of these bearings. This is avoided by the construction shown in FIG. 1 in which, instead of mounting the bearing upon the shaft extension, the bearing 66 is mounted upon the tubular extension 30 of the housing, which is always stationary relative to the engine 58. Consequently, whenever the engine 58 operates, the pulley 60, the belt 62 and the pulley rim 64 operate to cause relative rotation of the inner and outer races of the ball bearing 66 to keep the balls rotating in their races to prevent the fretting which caused failure of the bearings in former designs.

The pole faces 78 and 82 are parallel to and adjacent the armature plate 90 mounted on three diagonally or obliquely extending thin leaf springs 92 riveted to the triangular shaped hub 94 keyed to the outer end of the shaft extension 32. The hub 94 is also held in place by a snap-ring 96 in a groove at the end of the shaft extension holding the hub against a small shoulder 98. The armature plate preferably is made of inner and outer rings 121 and 123 of sintered iron or soft steel bonded together by an intervening plastic ring 125 also of brake lining material. The rings 121, 123 and 125 together form a unitary thin flat armature plate having its inner face parallel to and adjacent the pole faces 78 and 82. The oblique leaf springs 92 normally hold the armature disc slightly spaced from the pole faces 78 and 82 to provide a gap, as shown in FIG. 1. The arrangement provides four crossings of the gap in a potential magnetic path and bridges from the pole face 78 to the ring 121 and thence to the interpole ring 84 and from there to the outer ring 123 and across the gap to the pole face 82.

The tubular extension 30 is provided with an outer cylindrical flange 127 extending into overlapping relationship with an oppositely extending flange 129 upon the pulley rim 64 to complete the magnetic circuit and provide a magnetic bridge. The tubular extension 30 may be made of sintered iron or soft steel. The tubular extension 30 holds within it between its inner tubular portion and its outer flange portion 127, an electromagnet coil 131. This electromagnet coil is connected to a battery or other energizing source, not shown, through manual and thermostatic switches, also not shown, whenever the clutch is to be engaged. Energizing the electromagnetic coil 131 causes a strong flow of magnetic flux through the tubular extension 30 to the inner magnetic section 72 of soft steel or sintered iron to the pole face 78 and across the gap to the inner ring 121 and from the inner ring 121 back across the gap to the interpole ring 84, thence back across the gap to the outer ring 123 and again across the gap back to the pulley rim 64.

This arrangement provides four crossings of the gap by the magnetic flux, which greatly increases the magnetic pull or attraction of the armature plate 90 to the pole faces for the same amount of energization provided by the electromagnet coil 131. The magnetic flux flows through the pulley rim to the flange 129 and directly across the gap to the flange 127 to complete the magnetic circuit. The oblique leaf springs 92 are sufficiently long and flexible to allow the axial movement of the armature plate into engagement with the pole faces 78 and 82 as well as the face of the interpole ring 84 and the aligned faces of the brake lining material 80 when the electromagnet coil 131 is energized.

The brake lining material 125 also contacts the face of the inter-pole ring 84. The presence of the brake lining material 80 and 125 in the pole faces between the composite pulley and the armature plate 90 prevents excessive wear and galling of the steel portions of the pole faces. The combination of the multiple crossings of the gap by the magnetic flux and the friction of the contacting faces provides a very powerful clutch action with a small expenditure of current. The presence of the brake lining material in the faces of the composite pulley and the armature plate 90 insures long wear of these faces without scoring. This makes it possible for the clutch to be frequently engaged and disengaged, as required by a thermostatic control, without the danger of damage or failure. The electromagnet coil 131 is surrounded by the magnetic circuit, making it very efficient in the transmission of flux thereto, providing good cooling thereof and preventing excessive heating. The electromagnetic coil is well protected from damage from careless mechanics. Through the use of the composite pulley and armature plate, an efficient, durable, powerful clutch is provided.

In FIG. 3, a simplified form of composite pulley is provided in which the pulley rim 164 has a cylindrical flange 166 of reduced diameter which is overlapped by the flange 168 extending from the tubular extension 170. The pulley rim 164 also has a radially extending flange 172 of larger diameter extending to the extreme edge of the homogeneous armature plate 174 of sintered iron or soft steel. The tubular extension 170 is provided with an inner enlarged heavy portion, providing a deep shoulder 176 for receiving the ball bearing 178 mounted upon the reduced outer portion of the tubular extension 170 in a manner similar to FIG. 1. The inner magnetic section 180 of the composite pulley has a substantially inner cylindrical wall which overlaps the thick portion of the tubular extension 170 and receives the outer race of the ball bearing 178. The outer surface of the inner section 180 is generally tapered with a slight flare at its portion of largest diameter adjacent the armature plate 174. The inner magnetic section 180 is formed to provide a relatively narrow pole face 182 adjacent its portion of largest diameter adjacent the inner portion of the armature plate 174. The inner magnetic section 180 and the pulley rim 164 are bonded together by the brake lining material 184 which separates them magnetically and fills in the space between them. This design avoids the complication of the inter-pole ring 84 and the composite armature plate 90, as shown in FIG. 1 and is therefore lower in cost but is not as powerful or as efficient as the form shown in FIG. 1. The remaining parts of the structure may be like that shown in FIG. 1 and carry the same reference characters.

A more compact form is shown in FIG. 4 in which the pulley rim 220 containing an annular V-groove 222 receiving a V-belt 224 is provided with a wide annular flange 226 overlapping the wide annular flange 228 of of the tubular extension 230 extending from the housing 232. The pulley rim 220 is relatively thin in radial thickness and is provided with a peripheral flange incorporating a pole face 234 adjacent the face of a composite armature plate 236 generally similar to the armature plate 90 of FIG. 1. The pulley rim 220 is provided with a recess slightly larger than the inter-pole ring 238 which it receives. The space within the recess surrounding the inter-pole ring 238 may be filled with brake lining material, bonding the inter-pole ring to the pulley rim. The inter-pole ring 238 is also provided with spacing projections centralizing it in its recess. A ring 240 of brake lining material bonds the inner periphery of the pulley rim 220 to the outer periphery of the inner magnetic section 242 having a shoulder and snap-ring similar to that shown in FIG. 1 on its inner periphery receiving and locking in place the outer race of the ball bearing 244. This ball bearing 244 has its inner race mounted upon the reduced portion of the tubular extension 230 by a shoulder and snap-ring in a manner similar to FIG. 1. The electromagnet coil 245 is located in a position corresponding to that of FIG. 1. The remaining corresponding parts bear the corresponding reference characters of similar parts in FIG. 1. This arrangement provides a clutch substantially as powerful and efficient as the form shown in FIG. 1 but the structure is kept within a smaller diameter. The armature plate 236 preferably is composed of an outer ring 246 and an inner ring 248 connected and bonded together by an intervening ring 250 of brake lining material similar to FIG. 1. The plate 236 is connected by the leaf springs 92 to the hub 94 similar to the arrangement shown in FIG. 2 and FIG. 1.

In FIGS. 5 and 6 the structure is again kept within a small diameter and provides two pulley grooves and V-belts for greater driving power. Instead of a direct magnetic attraction type of electromagnetic clutch, the form shown in FIG. 5 employs the magnetic clutch to initiate and terminate the operation of a set of ball-spreaded spreader reaction discs, one of which is connected to the hub of the drive shaft of the compressor or driven element.

Referring now more particularly to FIG. 5, the compressor or driven device is provided with the customary housing 321 supported by a bracket 323 from the gasoline motor and has rigidly connected to it a tubular extension 325 surrounding the reduced extension 327 of the drive shaft 329 which is mounted upon the ball bearing 331 within the housing 321. The shaft 329 drives the compressor or other device to be driven within the housing 321. The reduced extension 327 is surrounded by a shaft seal 333 making a fluid seal with the tubular extension 325 similar to that shown in FIG. 1. The tubular extension 325 supports the inner race of the ball bearing 335 and the electromagnet coil 337 in a manner similar to that shown in FIG. 1. The tubular extension 325 has an outer cylindrical flange 339 overlapping the flange 341 upon the pulley rim 343 containing two annular V-grooves provided for the matched V-belts 345 and 347. The pulley rim 343 may be made of sintered or soft iron or steel and has a shoulder 349 providing an annular pole face and an elongated cylindrical flange 351 extending therefrom. The inner magnetic section 353 has an inner flange extending closely into a shoulder portion of the tubular extension 325 to provide an efficient magnetic bridge therewith. The inner magnetic section 353 also extends forwardly to provide the pole face 355. Between the inner magnetic section 353 and the pulley rim 343 is a ring of brake lining material 357 bonding the rim 343 and the inner magnetic section 353 to form a composite twin-grooved pulley. This ring 357 has a wide face aligned with and extending between the pole faces 349 and 355 providing a long wearing friction surface.

The cylindrical flange 351 has threaded or otherwise fastened to it a plate 359, preferably of brake lining material, having a friction face 361. If desired, this plate 359 may be made largely of metal but the friction face 361 is preferably of another material such as brake lining material. In between the friction face 361 and the pole faces 349 and 355 and the face of the brake lining material 357 are the spreader reaction discs 363 and 365. These spreader reaction discs 363 and 365 are preferably made of sintered iron and have six ball sockets 367 in their faces having ball ramps 369 of approximately a 28° angle in the counter-clockwise direction as viewed in FIG. 6, and ball ramps 371 in a clockwise direction of an angle of about 40° relative to the face of the discs. A ball 373 is located in each of the sockets 367. The outermost disc 365 is riveted to three oblique spring members 375 (arranged similarly to the leaf springs 92 as shown in FIGURE 2) connecting with the hub 377 (similar to the hub 94 as shown in FIGURE 2) upon the shaft extension 327 in a manner similar to that described in connection with the armature plate 90 and the hub 94 in FIG. 1. A light conical spring 379 bears on the inside against the shoulder 381 upon the shaft extension 327 and bears on the outside against the spreader disc 363 to tend to hold the balls 373 in the bottom of their sockets and continuously provides a light force tending to push the disc 363 toward the disc 365. The disc 363 also serves as an armature plate cooperating with the pole faces 349 and 355.

When the electromagnet 337 is energized, magnetic flux flows through a magnetic circuit which includes the tubular extension 325 and the inner magnetic section 353 to the pole face 355 and across the gap to the armature plate disc 363 and back across the gap to the pole face 349 and thence through the pulley rim 343 and across the magnetic gap between the flanges 341 and 339 to complete the magnetic circuit. The disc 363 is thereby magnetically attracted into engagement with the pole faces 349 and 355 and the aligned surface of the brake lining material 357. The composite pulley is being rotated continuously by the matched belts 345 and 347 while the shaft extension 327 and the shaft 329 are stationary when the clutch is disengaged. Since the disc 363 is now magnetically attracted to the rotating composite pulley and since the disc 365 is connected to the stationary shaft 329, there is instantaneous relative rotation between the discs 363 and 365, causing the balls 373 to roll up the 28° ramps at the ends of their sockets 367 to spread the discs 363 and 365 apart and firmly into engagement with the pole faces 349 and 355 as well as the face of the brake lining material 357 on the one (left) side and the friction face 361 on the opposite (right) side to provide a firm, powerful clutching between the composite pulley and the drive shaft 329 sufficient to transmit 20 H.P. This will continue as long as the electromagnet 337 is energized. Only a small electric current is required to energize the electromagnet 337 sufficiently to accomplish this. As soon as the electromagnet 337 is deenergized, the flow of magnetic flux will diminish rapidly, allowing the armature disc 363 to be released from the composite pulley and the conical spring 379 will press against the spreader disc 363 to force the balls 373 into the bottom of their sockets 367 to bring the spreader discs 363 and 365 closer together to the position shown in FIG. 5 in which they are out of contact with the faces 349, 355 and 361 to disconnect the composite pulley from the drive shaft 329. The remaining parts corresponding to similar parts in FIG. 1 have the same reference characters applied thereto. This clutch, in a relatively small diameter, provides a very powerful clutching action with a minimum of parts and mechanical complications, upon a small current flow.

While the embodiment of the present invention as herein disclosed constitutes a preferred form, it is to be understood that other forms might be adopted.

What is claimed is as follows:

1. In combination, a device provided with a housing and a rotatable shaft protruding from the housing and rotatable relative to the housing, a cantilever bearing support surrounding the shaft connected and fixed to and supported by said housing, a bearing surrounding and supported upon said bearing support, a rotatable means rotatably mounted on said bearing and provided with a clutch element of magnetic material, a cooperating clutch element of magnetic material operably connected to said shaft, one of said clutch elements being provided with a mounting arrangement providing a limited axial movement, and electromagnetic means associated with one of said clutch elements for attracting the other clutch element.

2. In combination, a device provided with a housing and a rotatable shaft protruding from the housing and rotatable relative to the housing, a normally stationary cantilever bearing support surrounding the shaft connected and fixed to and supported by said housing, a bearing surrounding and supported upon the projecting end of said bearing support, a rotatable means rotatably mounted on said bearing and provided with a clutch element of magnetic material, a cooperating clutch element of magnetic material operably connected to said shaft, one of said clutch elements being provided with a mounting arrangement providing a limited axial movement, and electromagnetic means associated with one of said clutch elements for attracting the other clutch element, said rotatable means being provided with power transmission means.

3. In combination, a device provided with a housing and a rotatable shaft protruding from the housing and rotatable relative to the housing, a cantilever bearing support surrounding the shaft connected and fixed to and supported by said housing, a bearing surrounding and supported upon said bearing support, a rotatable means rotatably mounted on said bearing and provided with a clutch element of magnetic material, a cooperating clutch element of magnetic material operably connected to said shaft, one of said clutch elements being provided with a mounting arrangement providing a limited axial movement, said first mentioned clutch element including two rings of magnetic material and nonmagnetic material magnetically separating the two rings and physically connecting the two rings, said bearing support having portions extending adjacent said two rings to form a magnetic circuit including said cooperating clutch element, and electromagnetic means mounted upon and associated with said cantilever bearing support for providing a magnetic attraction between said clutch elements.

4. In combination, a device provided with a housing and a rotatable shaft protruding from the housing and rotatable relative to the housing, a cantilever bearing support surrounding the shaft connected and fixed to and supported by said housing, a bearing surrounding and supported upon said bearing support, a rotatable means mounted on said bearing and provided with a clutch element of magnetic material, a cooperating clutch element of magnetic material operably connected to said shaft, one of said clutch elements being provided with a mounting arrangement providing a limited axial movement, and electromagnetic means associated with one of said clutch elements for attracting the other clutch element, said cantilever bearing support being provided with a shaft seal recess, and a shaft seal located in said recess providing a seal between said shaft and said bearing support.

5. In combination, a device provided with a housing and a rotatable shaft protruding from the housing, a bearing support surrounding the shaft connected and fixed to and supported by said housing, a bearing surrounding and supported upon said bearing support, a rotatable means mounted upon said bearing and provided with oppositely facing clutch faces, a spreader reaction means extending between said clutch faces and being operatively connected to said shaft, a portion of one of said clutch faces and a portion of said spreader reaction means being of magnetic material, and electromagnetic means associated with said magnetic material for activating said spreader reaction means into engagement with said clutch faces to connect said rotatable means and said shaft.

6. In combination, a device provided with a housing and a rotatable shaft protruding from the housing and rotatable relative to the housing, a rotatable means rotatably mounted and provided with a clutch element of magnetic material, a cooperating clutch element of magnetic material operably connected to said shaft, one of said clutch elements being provided with a mounting arrangement providing a limited axial movement, one of said clutch elements including two rings of magnetic material and nonmagnetic long wearing friction material containing a bonding resin bonding together and magnetically separating the two rings, and electromagnetic means magnetically associated with said clutch elements for providing a magnetic attraction between said clutch elements.

7. In combination, a device provided with a housing and a rotatable shaft protruding from the housing and rotatable relative to the housing, a rotatable means rotatably mounted and provided with a clutch element of magnetic material, a cooperating clutch element of magnetic material operably connected to said shaft, one of said clutch elements being provided with a mounting arrangement providing a limited axial movement, one of said clutch elements including three coaxial rings of magnetic material and nonmagnetic long wearing friction material containing a bonding resin bonding together and extending between and magnetically separating the three rings, said cooperating clutch element including two coaxial armature portions of magnetic material magnetically separated, the respective rings and armature portions of the two clutch elements being located opposite to and overlapping the intervening nonmagnetic material of the other clutch element, and electromagnetic means magnetically associated with said clutch elements for providing a magnetic attraction between said clutch elements.

(References on following page)

References Cited in the file of this patent

UNITED STATES PATENTS

| | | | |
|---|---|---|---|
| 1,925,956 | Easter | Sept. 5, | 1933 |
| 2,267,114 | Lear et al. | Dec. 23, | 1941 |
| 2,401,003 | Lear | May 28, | 1946 |
| 2,407,757 | MacCallum | Sept. 17, | 1946 |
| 2,555,215 | Warner | May 29, | 1951 |
| 2,578,715 | Mason | Dec. 18, | 1951 |
| 2,578,716 | Oetzel | Dec. 18, | 1951 |
| 2,605,877 | Winther | Aug. 5, | 1952 |
| 2,649,941 | Doebeli | Aug. 25, | 1953 |
| 2,703,378 | Harter | Mar. 1, | 1955 |
| 2,739,683 | Gamundi | Mar. 27, | 1956 |
| 2,796,963 | Harter | June 25, | 1957 |
| 2,816,636 | Weibel | Dec. 17, | 1957 |
| 2,861,225 | Mergen | Nov. 18, | 1958 |
| 2,861,664 | Simon et al. | Nov. 25, | 1958 |
| 2,875,875 | Prahauser et al. | Mar. 3, | 1959 |
| 2,880,595 | McGuffey et al. | Apr. 7, | 1959 |
| 2,907,426 | Jacobs | Oct. 6, | 1959 |
| 2,914,156 | Harting | Nov. 24, | 1959 |
| 2,919,000 | Clayton | Dec. 29, | 1959 |
| 2,919,775 | Wiedmann et al. | Jan. 5, | 1960 |
| 2,919,777 | Walter | Jan. 5, | 1960 |
| 2,933,171 | Kraeplin | Apr. 19, | 1960 |
| 2,947,394 | Grover | Aug. 2, | 1960 |